(12) United States Patent
Mendlovic et al.

(10) Patent No.: US 9,900,562 B2
(45) Date of Patent: Feb. 20, 2018

(54) SYSTEM AND METHOD FOR LIGHT-FIELD IMAGING

(71) Applicant: RAMOT AT TEL-AVIV UNIVERSITY LTD., Tel Aviv (IL)

(72) Inventors: David Mendlovic, Tel Aviv (IL); Ran Schleyen, Rehovot (IL); Uri Eliezer Mendlovic, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 15/321,505

(22) PCT Filed: Jun. 25, 2015

(86) PCT No.: PCT/IL2015/050660
§ 371 (c)(1),
(2) Date: Dec. 22, 2016

(87) PCT Pub. No.: WO2015/198331
PCT Pub. Date: Dec. 30, 2015

(65) Prior Publication Data
US 2017/0201727 A1    Jul. 13, 2017

Related U.S. Application Data

(60) Provisional application No. 62/016,740, filed on Jun. 25, 2014.

(51) Int. Cl.
H04N 9/04    (2006.01)
H04N 9/07    (2006.01)
(Continued)

(52) U.S. Cl.
CPC ............. *H04N 9/045* (2013.01); *G02B 5/201* (2013.01); *G03B 33/16* (2013.01);
(Continued)

(58) Field of Classification Search
CPC .......... H04N 9/045; H04N 9/07; H04N 9/643; H04N 5/23212; G03B 5/201; G03B 33/16
(Continued)

(56) References Cited

U.S. PATENT DOCUMENTS 8,143,565 B2 *  3/2012  Berkner ................ G01J 1/0492
                                                        250/208.1
8,345,144 B1    1/2013  Georgiev et al.
(Continued)

FOREIGN PATENT DOCUMENTS

CN          203163728        8/2013

OTHER PUBLICATIONS

Green, et al., Multi-Aperture Photography, ACM Transactions on Graphics, 2007, pp. 68-1-68-7, vol. 26, No. 3.
(Continued)

*Primary Examiner* — Pritham Prabhakher
(74) *Attorney, Agent, or Firm* — Browdy and Neimark, PLLC (57) ABSTRACT

A light-field imaging system and a method for generating light-field image data are presented. The system comprising an imaging lens unit, a detector array and a polychromatic patterned filter located in optical path of collected light, being at an intermediate plane between the lens unit and the detector array. The method comprising: acquiring image data of a region of interest by passing input light coming from said region of interest through said imaging lens unit and said polychromatic patterned filter to be detected by said detector array to generate corresponding image data; and processing said image data to determined light components passing through different regions of said polychromatic patterned filter corresponding to different colors and different parts of the region of interest to provide light-field image data of said region of interest.

21 Claims, 4 Drawing Sheets

(51) Int. Cl.
*G02B 5/20* (2006.01)
*G03B 33/16* (2006.01)
*H04N 9/64* (2006.01)
*H04N 5/232* (2006.01)

(52) U.S. Cl.
CPC .......... *H04N 5/23212* (2013.01); *H04N 9/07* (2013.01); *H04N 9/643* (2013.01)

(58) Field of Classification Search
USPC ........................................................ 348/280
See application file for complete search history.

(56) References Cited

U.S. PATENT DOCUMENTS

| | | | |
|---|---|---|---|
| 8,619,126 B2 | 12/2013 | Gharib et al. | |
| 8,724,000 B2* | 5/2014 | Georgiev | H04N 5/2254 348/307 |
| 8,949,078 B2* | 2/2015 | Berkner | G01J 1/0492 703/1 |
| 9,137,503 B2* | 9/2015 | Waqas | G06T 3/4015 |
| 9,363,425 B2* | 6/2016 | Black | H04N 5/2257 |
| 9,426,383 B1* | 8/2016 | Hinkel | H04N 5/238 |
| 2008/0187305 A1* | 8/2008 | Raskar | G02B 27/0075 396/268 |
| 2009/0096914 A1* | 4/2009 | Domenicali | G01J 3/2803 348/345 |
| 2009/0295829 A1* | 12/2009 | Georgiev | G03B 15/00 345/620 |
| 2010/0026852 A1* | 2/2010 | Ng | G02B 3/0056 348/239 |
| 2010/0265386 A1* | 10/2010 | Raskar | G02B 27/0075 348/340 |
| 2011/0073752 A1 | 3/2011 | Berkner et al. | |
| 2012/0105691 A1* | 5/2012 | Waqas | G06T 3/4015 348/280 |
| 2014/0160326 A1* | 6/2014 | Black | H04N 5/2257 348/262 |
| 2015/0233704 A1* | 8/2015 | Martini | G01B 11/046 356/635 |

OTHER PUBLICATIONS

Willert, et al., Three-dimensional particle imaging with a single camera, Experiments in Fluids, 1992, pp. 353-358, vol. 12.

Mairal, et al., Sparse Representation for Color Image Restoration, IEEE Transactions on Image Processing, Jan. 2008, pp. 53-69, vol. 17, No. 1.

Marwah, et al., Compressive Light Field Photography using Overcomplete Dictionaries and Optimized Projections, ACM Transactions on Graphics (TOG), 2013, vol. 32, issue 4.

* cited by examiner

SYSTEM AND METHOD FOR LIGHT-FIELD IMAGING

TECHNOLOGICAL FIELD

The present invention relates to system and method for imaging a scene. The invention relates in particular to collection and recording of light field data allowing imaging of the scene while enabling refocusing of the acquired image onto different object planes.

BACKGROUND ART

References considered to be relevant as background to the presently disclosed subject matter are listed below:
Marwah, Kshitij, Gordon Wetzstein, Yosuke Bando, and Ramesh Raskar. "Compressive light field photography using overcomplete dictionaries and optimized projections." *ACM Transactions on Graphics (TOG)* 32, no. 4 (2013): 46
Mairal, Julien, Michael Elad, and Guillermo Sapiro. "Sparse representation for color image restoration." *Image Processing, IEEE Transactions on* 17, no. 1 (2008): 53-69

Acknowledgement of the above references herein is not to be inferred as meaning that these are in any way relevant to the patentability of the presently disclosed subject matter.

BACKGROUND

Light-field imaging techniques utilize collection of data about light propagation to generate a four-dimensional image data of a region of interest. The 4D image data allows refocusing onto different object planes and varying the focus region after acquiring the image data.

Conventional light-field imaging systems use several techniques to provide information about the propagation path of light rays into a detector. Some known technique utilize a micro-lens array or gray-level patterned filter located in optical path of collected light.

Marwath et al described that light field photography has gained a significant research interest in the last two decades; today, commercial light field cameras are widely available. Nevertheless, most existing acquisition approaches either multiplex a low-resolution light field into a single 2D sensor image or require multiple photographs to be taken for acquiring a high-resolution light field. We propose a compressive light field camera architecture that allows for higher-resolution light fields to be recovered than previously possible from a single image. The proposed architecture comprises three key components: polychromatic light field atoms as a sparse representation of natural light fields, an optical design that allows for capturing optimized 2D light field projections, and robust sparse reconstruction methods to recover a 4D light field from a single coded 2D projection. In addition, we demonstrate a variety of other applications for light field atoms and sparse coding techniques, including 4D light field compression and denoising.

GENERAL DESCRIPTION

The present invention provides a novel technique for collection of light-field image data. The technique of the present invention utilizes a polychromatic patterned filter located at an intermediate plane between an imaging lens arrangement and a detector array (e.g. of a camera unit). Such polychromatic patterned filter spatially modulates the incoming light of different wavelength ranges (colors) into a structured light that allows post extraction of ray tracing data from the acquired image. It should be noted that the use of the polychromatic patterned filter obviates a need for an RGB filter (e.g. Bayer filter or other color filter arrays (CFA)) located directly on the detector array.

It should also be noted that although the system is generally described as utilizing one polychromatic patterned filter placed at an intermediate plane between the imaging lens and the detector array, two or more patterned filters may be used, wherein at least one of the filters is polychromatic. The use of additional filters may be for completion of colors which may be difficult to print on a single filter or to increase lateral resolution of the patterned filters. The two or more patterned filters are located at intermediate plane(s) between the imaging lens and the detector array to allow patterning of input light such that appropriate post processing thereof provides light-field data.

The polychromatic patterned filter may also be configured to dynamically vary its pattern, e.g. by utilizing a spatial light modulator (SLM) device. Such dynamic filter may enable variation of the pattern applied to input light in accordance with variation of a scene being viewed. Additionally, this provides for optimization of the post processing when an extremely high resolution light-field image data is required. This may be provided by acquiring several images of the same scene using different sensing matrices (filtering patterns), where each such sensing matrix is orthogonal to each of the other sensing matrices. Different filtering patterns may be achieved by variation of the patterned filter. This multi imaging technique provides higher sampling of the scene data and thus allows for higher resolution in the resulting image data.

It should be noted that as indicated above, the polychromatic patterned filter may be used by three separate SLM units such that each one of the SLM units applies patterning to light of different color(s).

The light-field imaging system of the present invention comprises an optical imaging arrangement comprising one or more lenses, a detector array comprising plurality of optical detecting elements and a polychromatic patterned filter located at an intermediate plane between the optical arrangement and the detector array.

It should be noted that in order to simplify matters and enhance understanding the optical imaging arrangement is referred to herein below as imaging lens. It should be understood that the term imaging lens is used herein below to refer to any optical imaging arrangement having one or more lenses and possibly additionally elements such as pupils/apertures etc.

The light-field data of the acquired image can be determined by post-processing of image data collected by the detector array. The post processing may generally utilize compressed sensing techniques for determining propagation path of different light portions enabling refocusing of the resulting image onto different portions of the scene.

To this end, the light-field imaging system may comprise a control unit configured to utilize data about the polychromatic filter to determine a four-dimensional data set indicative of light-field image data of the scene. Modules/circuits of the control unit may be integral with the detector array and/or connectable to the detector array (via wires or wireless signal transmission of any known suitable communication technique) and Thus the present invention, according to its broad aspect, provides a light-field imaging system comprising an imaging lens unit, a detector array and a polychromatic patterned filter located in the optical path of collected light, being at an intermediate plane between the lens unit and the detector array.

According to another broad aspect of the invention, there is provided a method for generating light-field image data of a region of interest, the method comprising:

collecting light indicative of an image data of the region of interest, applying predetermined spatial modulation to light components of different colors in the collected light, and directing spatially modulated light components of the collected light to a detector array to generate image data of the region of interest; and utilizing data indicative of said predetermined spatial modulation and processing said image data, and identifying the light components corresponding to different colors and different parts of the region of interest, and generating light-field image data of said region of interest.

Thus, according to one broad aspect of the invention, the present invention provides a light-field imaging system comprising an imaging lens unit, a detector array and a polychromatic patterned filter located in optical path of collected light, being at an intermediate plane between the lens unit and the detector array. The polychromatic patterned filter may carry a superposition of two or more binary patterns. Each of the two or more binary patterns may generally correspond to transmission or blocking of light of a corresponding wavelength range. Alternatively, the polychromatic patterned filter may carry a superposition of two or more gray-level patterns corresponding to partial blocking or transmission of light of the corresponding wavelength ranges.

According to some embodiments of the invention, the polychromatic patterned filter may carry a superposition of at least first, second and third patterns, each corresponding to filtering light of respective first, second and third wavelength ranges. Generally, the first, second and third wavelength ranges provide a set of primary colors. The first, second and third wavelength ranges may for example be selected from the following: red, green and blue; and cyan, magenta and yellow.

In some other embodiments, the polychromatic patterned filter may carry a superposition pattern of four wavelength ranges for example, utilizing wavelengths of three primary colors and Infra red wavelength (e.g. around 900 nm). More specifically, the polychromatic patterned filter may further carry a pattern configured for filtering/modulating transmission in a fourth wavelength range, said fourth wavelength range comprising infra-red.

According to some embodiments of the invention, the system may further comprise a control unit. The control unit comprises a processing utility configured and operable for receiving, from the detector array, gray-level image data corresponding to a scene being imaged, and for processing said gray-level image data in accordance with data about the polychromatic patterned filter to thereby generate a reconstructed polychromatic light-field data of said scene.

The processing utility may comprise a data optimizing module configured and operable to iteratively determine data indicative of the reconstructed image data in accordance with said data about the polychromatic patterned filter to thereby determine said reconstructed polychromatic light-field data of said scene.

Additionally or alternatively, the processing utility may comprise a dictionary selection module configured and operable to determine basis transformation operator in accordance with said data about the polychromatic patterned filter. The basis transformation operator may be selected such that the reconstructed polychromatic light-field data is sparse in the selected basis. The dictionary module may be configured and operable to determine basis transformation operator while preserving hue level in between dictionary atoms and acquired image data.

According to one other broad aspect, the present invention provides a method for generating light-field image data, the method comprising:

providing a polychromatic patterned filter at an intermediate plane between an imaging lens unit and a detector array;

acquiring image data of a region of interest by passing input light coming from said region of interest through said imaging lens unit and said polychromatic patterned filter to be detected by said detector array to generate corresponding image data; and processing said image data to determine light components passing through different regions of said polychromatic patterned filter corresponding to different colors and different parts of the region of interest to provide light-field image data of said region of interest.

Processing of the image data may comprise: determining the light-field image data in accordance with the acquired image data and representation of the acquired image data by a plurality of image atoms. The representation of the acquired image data by said plurality of image atom may be sparse in said plurality of image atoms. Moreover, in some embodiments, the plurality of image atoms may be selected to maintain hue level for said image data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
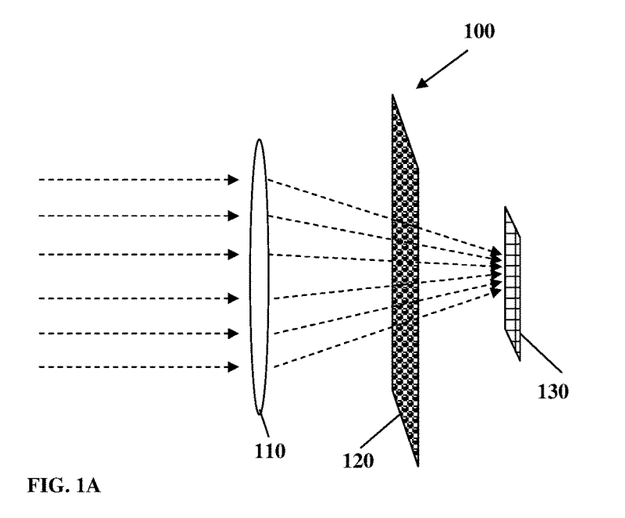
FIGS. 1A and 1B illustrate schematically two examples of the light-field imaging system according to the present invention, where FIG. 1A more specifically illustrates light propagation scheme in the imaging system and FIG. 1B more specifically a post-processing unit associated with the imaging system of FIG. 1A.

Reference in made to FIG. 1A illustrating a system 100, which is configured to acquiring light-field image data according to the present invention. As shown, the system 100 includes an imaging lens unit 110, a detector array 130 located at a predetermined plane downstream of the imaging lens unit 110, and a polychromatic patterned filter 120 located at an intermediate plane between the imaging lens unit and the detector array.

It should be noted that the imaging lens unit 110 may be a single lens or any other imaging lens arrangement including one or more lenses and possibly also additional optical elements such as one or more pupils etc. It should also be noted that in case the imaging lens unit includes an optical arrangement of a plurality of lenses, the polychromatic patterned filter 120 may be located at any intermediate optical plane between the first lens element (in a direction of light propagation from the region of interest) and the detector, i.e. the filter may be between any two lens elements of the optical arrangement.

The imaging lens 110 is configured to collect input light from a scene and generate a corresponding image data on the detector array 130. Generally, the imaging lens unit 110 is characterized by an effective focal plane f (which, in case of the single-lens unit, is the focal plane of the lens). As the scene may include various different objects located at different distances from the system 100 (i.e. different distances from the first lens of the imaging lens unit), the detector may generally be at an assumed image plane. For example, this may be a back focal plane of the lens unit in case of focusing to infinity during image acquisition, or at any plane corresponding to the lens unit focusing onto the biggest object in the region of interest, or focusing onto any predetermined distance from the lens unit defined herein as $Z_{fs}$.

As shown in FIG. 1A, light rays propagating towards the system 100 are collected by the lens unit 110 to form an image on the detector 130. At the same time, the collected light passes through the polychromatic patterned filter 120, which spatially modulates the collected light passing therethrough with a predetermined pattern. This allows post processing techniques to be applied to the so-created image data to determine regions of the lens unit where different portions of the collected light have passed through.

It should be noted that differently from conventional detector arrays, the detector array 130 according to the present invention does not utilize a chromatic filter array (CFA), which is located directly on the detector unit in the conventional systems, such as Bayer filter or generally any "on-sensor" color filter array. The Bayer filter is a known and generally the most common CFA, being a patterned filter located directly on top of conventional detector arrays and configured to filter light of different colors arriving to selected detectors of the array. This provides the conventional detectors with the ability to provide colored images, but indicating that certain detector elements measured red components of the collected light. Some other elements measure blue components of the light and some other measure green components of the light. The use of Bayer filter actually requires mixing of detector element to provide information about each pixel. This results in a significant reduced number of pixels being actually sampled, as compared to the number of elements of the detector array. As well as forces an unavoidable resolution reduction for any color image acquisition However, the number of pixels in the final image data may be kept similar utilizing interpolation of the acquired data.

Additionally, the use of a CFA (e.g. Bayer type CFA) may also reduce measured light intensity. Typically, only about 25% of the intensity in blue or red is detected by the detector unit, and only about 50% of the intensity in green. In combination with a patterned filter, this effect may reduce the signal to noise ratio of the acquired image. The inventors of the present invention have understood that by eliminating the need for a CFA, and utilizing a polychromatic patterned filter at the intermediate plane as described above to enable post processing of the image data, the data loss due to color filtering may be significantly decreased in the light field data.

Thus, as also indicated above, the light-field imaging system of the invention utilizes a polychromatic patterned filter allowing reconstruction of the colored image based on the patterned illumination impinging on the detector array. As will be described more specifically further below, this allows all the actual detector elements of the detector array to participate in light collection thereby providing higher resolution of the collected image. Moreover, this allows for higher light intensity to reach the detector providing greater signal to noise ratio.

Additionally, the mixing between detector elements limits the maximal efficient optical resolution that can be achieved to that of a spot size, being at least three detector elements. This is to maintain the required Nyquist condition for sampling.

According to the present invention, color data is encoded by light passage through the polychromatic patterned filter 120. This renders the use of Bayer filter as not needed, and thus enables to provide image data having similar number of pixels as the number of detector elements. Additionally, this reduces the minimal efficient spot size to the size of two pixels only, allowing increase in both the optical resolution and the geometrical resolution.

It should be noted that the polychromatic patterned filter may be based on RGB (Red, Green and Blue) color scheme, or alternatively on any other color scheme required for a specific use. For example, the polychromatic patterned filter may be configured based on other color schemes such as Cyan, Magenta and Yellow. In some embodiments, the polychromatic patterned filter may include an additional pattern filtering transmission in a fourth wavelength range, for example such fourth wavelength range may include near Infra red light. Additionally, the filter may be configured with regions such that different regions thereof are patterned based on a different color scheme. For example, a small area within the filter may be configured to pattern the input light with respect to a linear combination of Red, Green & Blue, while another area may pattern the input light with respect to a linear combination of Infra Red & Cyan.

The polychromatic patterned filter 120 is formed with different regions having different transmission properties for light of different wavelength ranges (colors), e.g. including binary transmission regions such that the region of this type is transmitting for one or more colors while not transmitting for one or more other colors. For example the filter 120 may be formed as a superposition of three separate patterned filters configured to vary light transmission for Blue, Green and Red light components. The filter may include a randomly generated pattern of regions of different optical transmissions, being binary or Gaussian varying transmission regions, and data about such random pattern is then provided. Alternatively or additionally the filter may have a predetermined pattern optimized for post processing of selected imagery scenes. For example, the pattern may be configured and optimized to allow higher image resolution of selected objects such as hand movement, human face, construction regions (e.g. buildings) etc. Such pattern optimization may be used to provide the light-field imaging system as described herein with higher capabilities for recognizing gesture motion, face recognition and/or provide accurate 3D configuration of selected area.

For example, as will be described in more details further below, the polychromatic patterned filter may be configured as plurality of regions, wherein each region is configured to allow transmission of light or a respective color or to block transmission thereof. In such configuration the filter may be in the form of three separate binary patterns where one of the patterns is configured to filter blue light, a second pattern is configured to filter red light and the third is configured to filter green light. This configuration provides a high contrast filter providing high immunity for calibration error (the intuition for this is that the Contrast of the mask vs. the values calibrated acts as SNR or calibration to noise ratio (CNR)) as the noise is constant—increasing the Contrast on the mask would mean improved CNR.

Figure 1B:
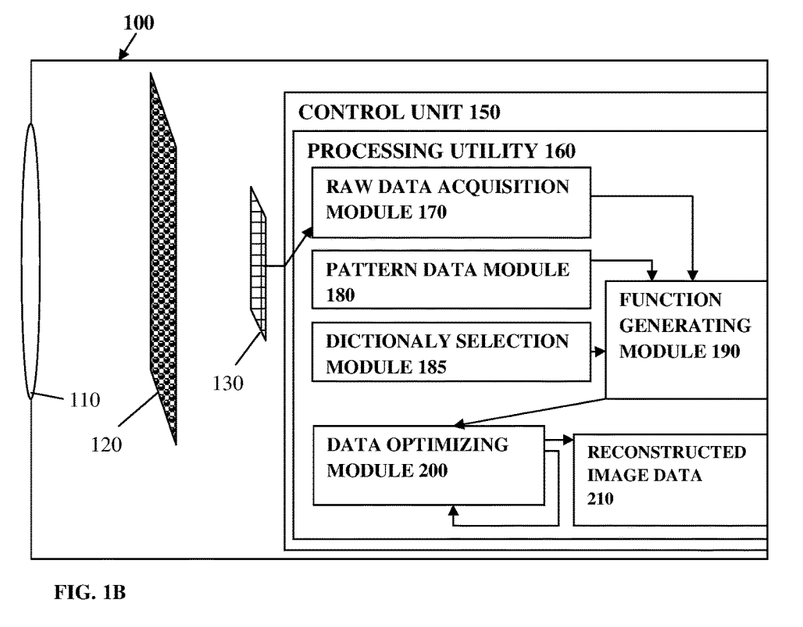

Reference is made to FIG. 1B illustrating an additional configuration of system 100 for light-field imaging. The system of FIG. 1B includes a control unit 150 connected to the detector array 130 and configured to receive image data generated by the detector. The control unit 150 is configured and operable for processing input data corresponding to a scene being imaged as received from the detector 130 and for generating reconstructed polychromatic light-field image data. Typically the input data generated by the detector 130 is monochromatic and provides data about light intensity, processing of the input data by the control unit 150 introduces color data to the resulting light-field image data. To this end, the control unit is configured to utilize data about the polychromatic pattern of the patterned filter 120, which may be pre-stored in the control unit 150 (e.g. in a storage utility thereof) or provided thereto for determining said light-field image date of the scene being imaged.

In this connection, according to some embodiments of the invention, the control unit 150 may typically be configured as a computing unit comprising a processing utility 160 as well as one or more other utilities such as storage utility and input and output utilities/ports which are not specifically shown here. The processing utility 160 may be configured with one or more software and/or hardware modules configured to perform computational steps for determining the light field data. For example, as shown in FIG. 1B, the processing utility 160 may include one or more of the following: raw data acquisition module 170 configured for receiving image data from the detector unit 130; a pattern data module 180 configured for providing data about the polychromatic pattern of the patterned filter 120; a dictionary selection module 185 configured for providing data about proper basis transformation for use in the processing; function generating module 190 configured to determining an energy function corresponding to relations between the input image data collected by the detector unit 130 and one or more patterns applied thereto by the polychromatic patterned filter 120; and data optimizing module 200 configured for determining an optimized state/level of the energy function. Generally, according to the present technique, the optimized state of the energy function corresponds to the reconstructed light field image data 210.

In this connection it should be noted that the term energy function or energy should be interpreted broadly as relating generally to a function or a functional of underlying interactions of a system. Determining of an optimized state typically includes determining a state that corresponds to minimal or maximal value of the energy function. Moreover, the technique of the present invention relates to forming of patterned or structured light by transmitting input light through a polychromatic patterned filter to thereby enable reconstruction of the collected patterned light to provide additional data about the input light (or a scene from which the input light originates). In this connection, the energy function generally corresponds to a relation between the collected image data (generally monochromatic), the modulating polychromatic patterned filter, and the complete set of light rays flowing through the system.

As indicated above, the control unit is configured and operable for post processing of the acquired image data in accordance with data about the polychromatic patterned filter 120 to generate a corresponding four-dimensional image data including light-field information, which enables refocusing of the acquired image onto different object plane(s) in the scene. In his connection, the post processing technique is performed to determine the desired 4D image data based on a linearly under-sampled problem:

$$I=\Phi L \qquad \text{(equation 1)}$$

where I is the image data received from the detector array 130, $\Phi$ is a predetermined sensing matrix being indicative of configuration of the polychromatic patterned filter 120, and L is the desired 4D Light field data.

For example, let's consider a detector array having N detector elements (e.g. N pixels) and a polychromatic patterned filter having M regions of different transmission properties, I is a vector of length N. The sensing matrix $\Phi$ represents light components passing through certain region of the filter 120 and arriving at certain detector element. Thus, the sensing matrix $\Phi$ is a matrix of dimension N×(N× M). The desired light-field data L represents the amount (or intensity) of light components passing through each region of the filter and arriving at each detector element. Thus, the desired light-field image is a vector of length N×M. It should be noted that as different regions of the patterned filter have different transmission properties with respect to light components of different colors, the elements of the light-field data L provide information about colors in the observed scene.

More specifically, according to the technique of the present invention, the data about the polychromatic pattern of the patterned filter 120 includes data about the at least three superimposed patterns corresponding to the different wavelength ranges (colors). This is while the input image data provided by the detector unit 130 may generally include a single data set corresponding to a monochromatic image data. In this connection, the processing unit is configured to determine and extract data about shapes and colors from the input image data. This may be exemplified by equation 1, rewritten as:

$$I^{gray\ level}=\Phi^{RGB}[L^R,L^G,L^B] \qquad \text{(equation 2)}$$

such that the detected image data I, as received by the raw data acquisition module 170, includes information about measured intensity per pixel of the detector unit 130, while generally not including color data. The information about wavelengths in a light ray arriving at a specific pixel from certain location in the scene is determined in the processing of the input data, in accordance with the patterned filter having different transmission regions for different colors/wavelengths of light.

As indicated above, the pattern data module 180 is configured for receiving (e.g. directly from the patterned filter 120) data about the polychromatic pattern thereof, and storing information about the pattern (e.g. in a storage utility being part of the control unit or being external thereto). As indicated above, the formulation of the pattern data as described by $\Phi^{RGB}$ above includes indication of transmission levels of different regions of the patterned filter 120 and their effect on light components passing through these regions and arriving at different pixels of the detector unit 130. In some embodiments, the pattern data include data about the polychromatic pattern and location of the patterned filter 120 with respect to the detector unit 130 and the imaging lens arrangement 110.

As both equations 1 and 2 have higher number of unknowns with respect to the number of algebraic equations, determination of a proper solution requires certain methods. Generally, a solution can be fully recovered by using enough samples (many images with orthogonal changes to the filter) or using some priors to limit the space of the possible solutions.

The technique of the present invention is preferably configured for use with Compressed Sensing techniques to determine the light-field image data $L=[L^R, L^G, L^B]$. The generally known concept of the Compressed Sensing technique assumes that the light-field image data is sparse under at least one basis.

More specifically, the concept of Compressed Sensing is generally known in the art and will not be described herein to detail, other that note the following. The Compressed Sensing technique utilizes an assumption that the desired data (light-field image data in the present case) can be presented as a sparse vector (preferably as most sparse vector) in certain basis. Thus, the light field image data L can be presented as L=Dx, where D is an appropriate basis transformation and x is its representation in the basis and has only few non-zero coefficients.

To this end, the processing unit 160 may generally include a dictionary selection module 185 configured for determining an appropriate basis and basis transformation operator D. The selection of basis for transformation may be manual, i.e. selection of a proper basis by an operator, or it may be done in accordance with the data about the polychromatic pattern or in accordance with the measured input image data. This is aimed at suitably determining a basis in which the image data is sufficiently sparse to provide effective processing and reconstruction.

Thus, the technique of the invention may utilize the Compressed Sensing technique, for the post processing of the image data I acquired according to the present invention, to determine a proper solution of $$|\Phi Dx - I| < \epsilon \quad \text{(equation 3)}$$

under the condition that x has only few non-zero coefficients. For example, this may be done by requiring minimizing of value of $|x|_1 = \Sigma_n |x_n|$. It should be noted that equation 3 may be applied utilizing first or second norm of $[\Phi Dx - I]$ as the case may be, e.g. $|\Phi Dx - I|^2 < \epsilon^2$ or $\|\Phi DX - I\|_1 < \epsilon$.

Various techniques are known in the art, for optimizing a process for determining a solution for equation 3 while satisfying the requirement for maximal sparsity of the solution. According to some embodiments of the invention, the function generating module 190 is configured to receive the input image data from the data acquisition module 170, filter pattern data from the pattern data module 180 and basis transformation data from the dictionary selection module 185, and to determine an energy function to be optimized. The energy function generally relates to equation 3 and includes a requirement for sparsity of the desired proper solution. According to some embodiments, the energy may take a form as follows:

$$\tfrac{1}{2}\|I-\Phi Dx\|_2^2 + \lambda\|x\|_1 \quad \text{(equation 4)}$$

where I, D, $\Phi$ and x are as described above, and $\lambda$ acts as sparsity Lagrange weight.

The data optimizing module 200 of the processing utility 160 is configured and operable to analyze the energy function and determine an optimized vector $x_n$ thereof. Generally, the optimized vector $x_n$ provides minimal value of the energy function and corresponds to the desired reconstructed image data. To this end, the data optimizing module 200 may be configured and operable to perform several iterations to determine the desired vector $x_n$. Additionally, the data optimizing module 200 may be configured to determine desired value of the Lagrange weight $\lambda$, which may be selected to simplify processing.

Figure 2:
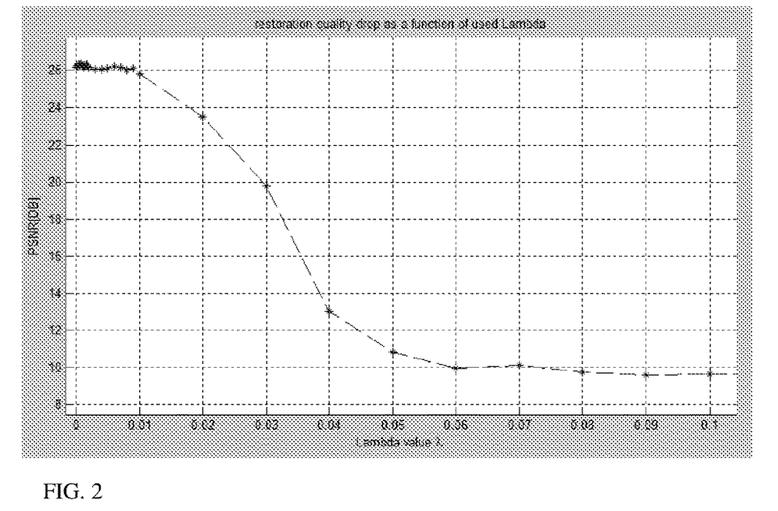
FIG. 2 shows simulated peak signal to noise ratio as a function of a level of requirement for sparsity condition utilizing the technique of the invention.

Generally, possible values of $\lambda$, differently from the selection of proper value for $\epsilon$ (in equation 3), are not determined a priory. FIG. 2 shows simulation results for dependence of the peak signal to noise ratio (PSNR) of the reconstruction as a function of $\lambda$ values. As shown, the inventors have found that the PSNR of reconstruction reduces sharply for $\lambda$ values greater than about 0.01. Generally, lower values of $\lambda$ provide for minimized value of $\|I-\Phi Dx\|_2^2$ while greater values enforce sparsity of the solution.

It should be noted that generally the preferred values of both $\lambda$ and $\epsilon$ may be determined in accordance with imaging conditions. For example, for low light imaging $\epsilon$ may be selected to receive a higher value over bright light conditions. Generally the value of $\epsilon$ may be determined in accordance with noise in the imaging conditions, this while $\lambda$ is determined to enforce sparsity condition for reconstruction and may be a result of system design.

According to some embodiments of the present invention, the polychromatic patterned filter may generally be designed in accordance with a predetermined preferred (or optimal) basis transformation D. Alternatively or additionally, the suitable basis transformation D may be selected in accordance with the polychromatic patterned filter. In this connection, the pattern of the polychromatic filter 120 may be configured to minimize the mutual coherence with respect to the different coefficient of D as follows:

$$\mu(D) = \max_{1 \le i,j < k, i \ne j} \frac{|d_i^T d_j|}{\|d_i\| \times \|d_j\|} \quad \text{(equation 5)}$$

where $d_i$ is the i-th element of D, and k is the basis dimension. Alternatively or additionally, the polychromatic patterned filter 120 may preferably be configured such that the pattern thereof optimizes the coherence $\mu(M)$, as defined in equation 3, where $M=\Phi \cdot D$.

In this connection it should be noted, and as indicated above, that one or more suitable basis transformations may be applied to increase efficiency of reconstruction. Additionally, the processing unit may include a dictionary selection module 185 configured to receive data about the polychromatic pattern and to select accordingly a suitable dictionary for basis transformation, e.g. from a plurality of such bases stored in a storage utility. Alternatively, such selection may be made manually by an operator.

To this end, it should be noted that, generally, a suitable basis for reconstruction may be determined by identifying a basis set for providing a suitable representation of an acquired image while requiring a minimal number of basis elements. Generally, the technique of identifying a suitable basis for representation, also referred to herein as dictionary, is based on an iterative technique including selecting a basis and determining an error measure between representations of image data is the selected basis and the actual image data.

The selected basis may then be adjusted in accordance with the determined error measure, e.g. by incorporating a vector representing the error measure into the basis set and/or adjusting the basis representation.

The inventors of the present invention have found that determining the proper dictionary (basis representation) requiring certain relation between wavelength components for each region or pixel of the image data, allows for color preservation in the restored image. In this connection, the relation between wavelength components may be defined by hue levels of different regions of the image data, indicating a relation between light intensity in each wavelength range of primary colors. Maintaining the hue level between the dictionary atoms/elements enforces color preservation in the reconstruction. To this end, an error measure between certain representation in dictionary elements (atoms) of the image and the image data itself may be determined in wavelength range relating to each of the primary colors in accordance with:

$$\langle y, x \rangle_\gamma = y^T \left( I + \frac{\gamma}{n} K \right) x \qquad \text{(equation 6)}$$

where y is a vector representation constructed of dictionary atoms, x is the image data, I is a unit matrix of the suitable dimension indicating the wavelength ranges of the primary colors used, K is a Hue maintenance operator that may be represented as a matrix in the form of $$K = \begin{pmatrix} J_n & 0 & 0 \\ 0 & J_n & 0 \\ 0 & 0 & J_n \end{pmatrix}, J_n(i, j) = 1 : \forall\, i, j \in n \qquad \text{(equation 7)}$$

The weight factor γ/n may be adjusted to determine the level of hue maintenance. This technique for dictionary selection provides maintenance of the color scheme for the restored image data and reduces error and noise caused by non uniform reconstruction between regions of the image.

Figure 3A:
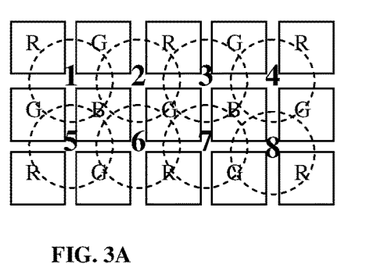
FIGS. 3A and 3B exemplify some advantages of the use of polychromatic patterned filter according to the present invention.
Figure 3B:
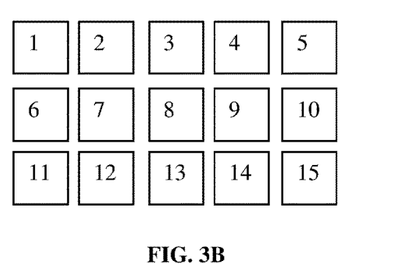

As indicated above, the light-field imaging system of the present invention utilizes a polychromatic patterned filter located at an intermediate plane between the imaging lens unit and the detector array. FIGS. 3A and 3B exemplify some of the advantageous features of this configuration. FIG. 3A illustrates a detector array utilizing a Bayer filter to distinguish between light components of different wavelength. Different detector elements are configured to detect light in Red, Green or Blue colors as marked in the figure. To provide reliable color image data, the output data of these detector elements is mixed to provide data of each pixel, numbered in the figure as 1-8. This decreases the number of pixels in the resulting image data, actually reducing the geometrical resolution of the imaging system. Practically, such reduced geometrical resolution limits the meaningful optical resolution requiring that a minimal light spot on the detector will cover at least three detector elements to provide a required Nyquist sampling rate.

FIG. 3B exemplifies the detector array according to the present invention. The use of polychromatic patterned filter between the imaging lens unit and the detector array provides color information while enabling not to use the CFA such as commonly used Bayer filter. This results in that each detector element may represent pixel data providing higher number of pixels for a given detector array. Additionally, the higher geometrical resolution enables the use of high optical resolution allowing Nyquist sampling rate that supports smaller light spots to be accurately measured.

Figure 4:
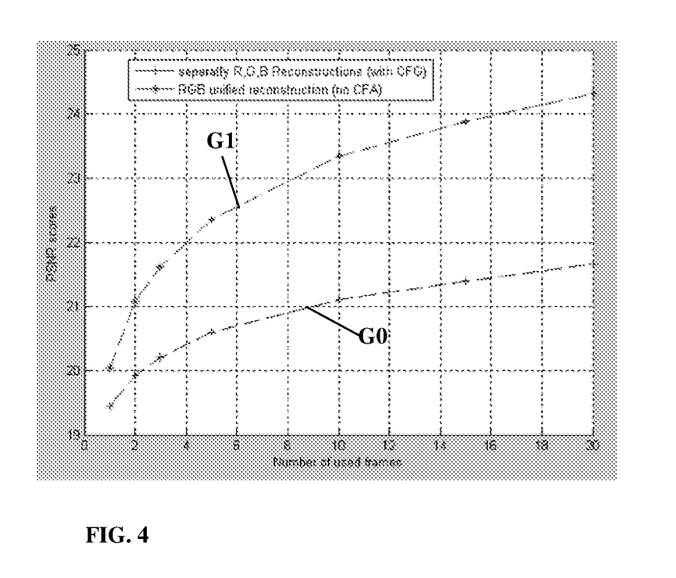
FIG. 4 shows simulated peak signal to noise ratio for reconstruction according to the technique of the invention and reconstruction in separate colors.

Reference is made to FIG. 4 showing simulation results of peak signal to noise ratio (PSNR) as a function of number of acquired frames utilizing the polychromatic patterned filter based imaging system 100 of the present invention (curve G1), and in a conventional light field imaging unit utilizing Bayer filter for providing color data (curve G0). As clearly shown, an increased number of exposures enables increase the signal to noise ratio of measurements. However, as also shown, the technique of the present invention, utilizing a polychromatic patterned filter 120 and appropriate post-processing to extrapolate the color image data in combination with regions of the filter 120 through which collected light components have past through, provides improved PSNR enabling reducing noise and aliasing while providing image data in resolution corresponding to the actual number of pixels in the detector 130.

Figure 5A:
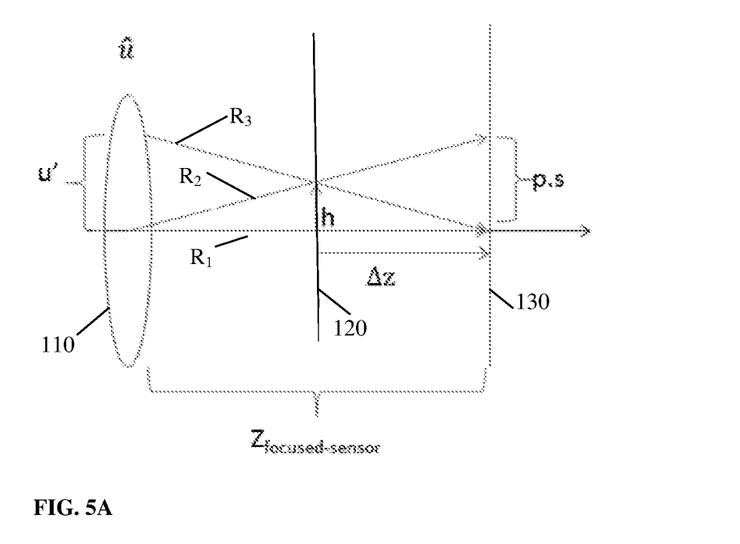
FIGS. 5A and 5B show configuration of the system of the invention and relative location of the patterned filter (FIG. 5A) and simulated peak signal to noise ratio for different arrangements of the patterned filter (FIG. 5B)

In this connection, design and location of the patterned filter 120 may be varied to optimize imaging performance of the system 100. Some considerations relating to the structure of the patterned filter are exemplified in FIGS. 5A and 5B. FIG. 5A exemplifies the imaging system 100 and three light rays $R_1$, $R_2$ and $R_3$. Light rays $R_1$ and $R_2$ pass at the center of the imaging lens 110 and reach different pixels of the detector unit 130. Light ray $R_3$ go through the imaging les at distance u' from the center and reach similar pixel of the detector unit 130 as light ray $R_1$. Also, as shown, the distance between the imaging lens 110 and the detector 130 is $Z_{fs}$, the patterned filter 120 is located at distance Δz from the detector 130, and the distance between the two different pixels (typically adjacent pixels) is ps. Utilizing this notation, light rays $R_1$ and $R_2$ pass through the patterned filter at different locations having a distance $h_1$ between them, where $h_1$ is given by:

$$h_1 = ps \cdot \frac{(Z_{fs} - \Delta z)}{Z_{fs}} \qquad \text{(equation 8)}$$

In order to allow efficient reconstruction of the image data, the patterned filter 120 may preferably be configured to increase contrast between two light rays such as $R_1$ and $R_2$. Additionally, the patterned filter 120 may preferably be configured to increase contrast between light rays $R_1$ and $R_3$, to enable the post processing to distinguish between data carried by these light rays. Independently of light rays $R_1$ and $R_2$, the distance between light rays $R_1$ and $R_3$ passing through the filter 120 may be given by:

$$h_2 = u' - u' \cdot \frac{(Z_{fs} - \Delta z)}{Z_{fs}} = u' \frac{\Delta z}{Z_{fs}} \qquad \text{(equation 9)}$$

As shown in the example of FIG. 5A, assuming $h_1 = h_2$ provides:

$$\Delta z = \frac{ps}{u' + ps} Z_{fs},$$

and further (as pixel separation is typically smaller with respect to desired angular resolution of the system):

$$\Delta z \approx \frac{ps}{u'} Z_{fs} = \frac{ps}{D} P \cdot Z_{fs} \quad \text{(equation 10)}$$

where P is the number of viewed angles per pixel and D is the diameter of the lens unit. As the distance between the lens unit 110 and the detector unit 130 is provided in accordance with focal length of the lens unit, equation 6 may be re-written as:

$$\Delta z = \frac{ps}{D} P \cdot \frac{Z_{obj} \cdot f}{Z_{obj} - f} \quad \text{(equation 11)}$$

providing desired optimal location for the patterned filter 120. Generally, in some embodiments, corresponding to typical configuration of most compact imaging systems and generic scheme, the distance $\Delta z$ between the patterned filter 120 and the detector unit 130 may be between 1 micrometer and 5 millimeters. In some other configurations, the distance $\Delta z$ may be between 5 micrometers and 500 micrometers. Generally the patterned filter may be located at a distance range of 25% more or less with respect to the results of equations 10 or 11.

Figure 5B:
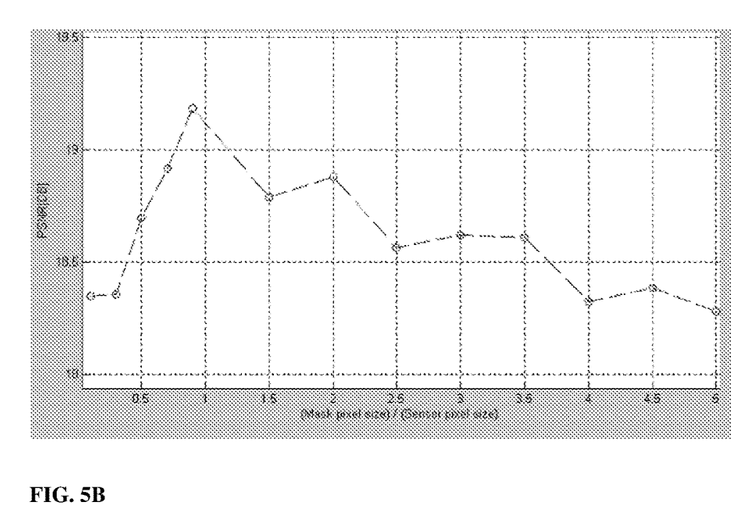

Utilizing the result of equation 10 in equation 8 indicates that high performance, such as high resolution and SNR, may be provided if the patterned filter 120 has pattern resolution that is substantially similar to geometrical resolution of the detector unit 130. More specifically, a distance between distinguishable regions of the patterned filter $h_1$, is preferably configured to be substantially similar to a distance between adjacent pixels ps of the detector unit 130. FIG. 5B shows PSNR simulated for different ratios between the pattern resolution of the filter 120 and the geometrical resolution of the detector 130. As shown, optimal performance may be achieved for ratio between region size of the filter 120 and pixel size of the detector 130 being between 0.5 and 2, and even better results are achieved for ratio between 0.75 and 1.25.

Figure 6:
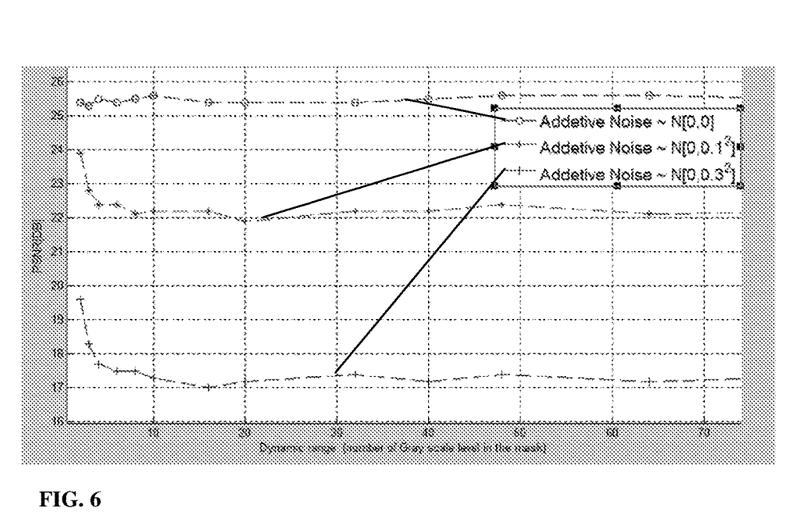
FIG. 6 shows simulated peak signal to noise ratio for image reconstruction with different levels of noise in accordance with dynamic range of the patterned filter.

Additionally, FIG. 6 shows simulation results comparing the PSNR characteristic of image reconstruction using the patterned filters of different dynamic ranges with three levels of additive noise. The dynamic range of the patterned filter is defined by a number of intermediate transmission levels between 100% transmission and 0% transmission for light of a specific wavelength (i.e. a specific region of the filter may allow transmission of red light while block blue and green light, or any other combination). More specifically, dynamic range of 2 indicates a binary pattern. As shown in FIG. 6, the dynamic range does not affect reconstruction performance in the absence of additive noise, while dynamic range of 2 (binary pattern) provides greater performance in the presence of noise with respect to higher dynamic range of the polychromatic patterned filter 120.

Thus, the present invention provides a light-field imaging system comprising an imaging lens unit, a detector array and a polychromatic patterned filter located in optical path of collected light, being at an intermediate plane between the lens unit and the detector array. The system of the invention, while eliminating a need for any CFA at the detector arrays as per the convention approach, enables higher image resolution than that of the conventional light-field imaging techniques, while requiring similar post processing complexity.

The invention claimed is:

1. A light-field imaging system comprising:
a detector unit comprising an array of detector elements and configured and operable to generate image data indicative of light collected by the detector elements,
an imaging lens unit configured for collecting input light from a scene and generating a corresponding image of the scene on the detector array to produce the image data,
a polychromatic patterned filter defining a predetermined sensing matrix indicative of a configuration of the polychromatic patterned filter and located in an optical path of the collected light, being at an intermediate plane between the lens unit and the array of detector elements, the polychromatic patterned filter providing mixing of light properties between the detector elements, and
a control unit configured and operable for receiving and processing the image data from the array of detector elements, said image data being indicative of the mixing of light properties between the detector elements corresponding to the sensing matrix of the polychromatic patterned filter, applying data about said sensing matrix to the received image data thereby providing a reconstructed polychromatic light-field image of said scene,
wherein said control unit comprises a processing utility, said processing utility comprises a data optimizing module configured and operable to iteratively determine data indicative of the reconstructed image data in accordance with data about the polychromatic patterned filter to thereby determine a reconstructed polychromatic light-field data of said scene.

2. The light field imaging system of claim 1, wherein the polychromatic patterned filter comprises a superposition of two or more binary patterns, each of said two or more binary patterns corresponding to transmission or blocking of light of a corresponding wavelength range.

3. The light field imaging system of claim 1, wherein said polychromatic patterned filter comprises superposition of at least first, second and third patterns each corresponding to filtering light of wavelength range such that first, second and third corresponding wavelength ranges provide a set of primary colors.

4. The system of claim 3, wherein said first, second and third wavelength ranges are selected from the following: red, green and blue; and cyan, magenta and yellow.

5. The system of claim 2, wherein said polychromatic patterned filter further comprises a pattern configured for filtering transmission in a fourth wavelength range, said fourth wavelength range comprising infra-red.

6. The system of claim 1, wherein said processing utility is configured and operable for receiving gray-level image data corresponding to a scene being imaged from the detector array, and for processing said gray-level image data in accordance with said data about the polychromatic patterned filter to thereby generate said reconstructed polychromatic light-field data of said scene.

7. The system of claim 6, wherein said processing unit further comprises a dictionary selection module configured and operable to determine basis transformation operator in accordance with said data about the polychromatic patterned filter, said basis transformation operator being selected such that said reconstructed polychromatic light-field data is sparse in the selected basis.

8. The system of claim 7, wherein said dictionary selection module is configured and operable to determine basis transformation operator while preserving hue level within between dictionary atoms and acquired image data.

9. The system of claim 1, wherein said data optimizing module is configured and operable for determining a four-dimensional image data L satisfying a condition I=ΦL where I is indicative of said gray-level image data and Φ is said sensing matrix indicative of configuration of the polychromatic patterned filter, and wherein L can be presented as L=Dx, where D is an appropriate basis transformation and x is its representation in the basis and has only few non-zero coefficients.

10. The system of claim 1, wherein said reconstructed polychromatic light-field image comprises four-dimensional image data enabling refocusing of the resulting image onto different portions of the scene.

11. The system of claim 1, configured as a camera unit.

12. A method for generating light-field image data of a region of interest, the method comprising:
 providing a polychromatic patterned filter at an intermediate plane between an imaging lens unit and a detector array;
 collecting light indicative of an image data of the region of interest, applying predetermined spatial modulation to light components of different colors in the collected light, and directing spatially modulated light components of the collected light to form an image on the detector array to thereby generate image data of the region of interest; and
 processing said image data utilizing data indicative of said predetermined spatial modulation and, said processing comprises identifying light components corresponding to different colors and different parts of the region of interest, and generating light-field image data of said region of interest,
 wherein said processing comprises iteratively determining data indicative of a reconstructed image data in accordance with data about the polychromatic patterned filter to thereby determine a reconstructed polychromatic light-field data of said region of interest.

13. The method of claim 12, wherein said processing comprising determining said light-field image data in accordance with the acquired image data and representation of the acquired image data by a plurality of image atoms.

14. The method of claim 13, wherein said representation of the acquired image data by said plurality of image atom is sparse in said plurality of image atoms.

15. The method of claim 13, wherein said plurality of image atoms being selected to maintain hue level for said image data.

16. The method of claim 12, wherein said processing comprises determining a four-dimensional image data L satisfying a condition I=ΦL where I is indicative of said gray-level image data and Φ is a predetermined sensing matrix being indicative of configuration of the polychromatic patterned filter, and wherein L can be presented as L=Dx, where D is an appropriate basis transformation and x is its representation in the basis and has only few non-zero coefficients.

17. A method for generating light-field image data, the method comprising:
 providing a polychromatic patterned filter at an intermediate plane between an imaging lens unit and a detector array;
 acquiring image data of a region of interest by passing input light coming from said region of interest through said imaging lens unit and said polychromatic patterned filter to be detected by said detector array to generate corresponding image data; and
 processing said image data to determined light components passing through different regions of said polychromatic patterned filter corresponding to different colors and different parts of the region of interest to provide light-field image data of said region of interest,
 wherein said processing comprises iteratively determining data indicative of a reconstructed image data in accordance with data about the polychromatic patterned filter to thereby determine a reconstructed polychromatic light-field data of said region of interest.

18. The method of claim 17, wherein said processing comprising determining said light-field image data in accordance with the acquired image data and representation of the acquired image data by a plurality of image atoms.

19. The method of claim 18, wherein said representation of the acquired image data by said plurality of image atom is sparse in said plurality of image atoms.

20. The method of claim 18, wherein said plurality of image atoms being selected to maintain hue level for said image data.

21. The method of claim 17, wherein said processing comprises determining a four-dimensional image data L satisfying a condition I=ΦL where I is indicative of said gray-level image data and Φ is a predetermined sensing matrix being indicative of configuration of the polychromatic patterned filter, and wherein L can be presented as L=Dx, where D is an appropriate basis transformation and x is its representation in the basis and has only few non-zero coefficients.

* * * * *